(12) United States Patent
Yamaguchi

(10) Patent No.: US 9,742,036 B2
(45) Date of Patent: Aug. 22, 2017

(54) ANODE MATERIAL, ANODE AND BATTERY

(75) Inventor: Hiroyuki Yamaguchi, Fukushima (JP)

(73) Assignee: SONY CORPORATION, Tokyo (JP)

( * ) Notice: Subject to any disclaimer, the term of this patent is extended or adjusted under 35 U.S.C. 154(b) by 468 days.

(21) Appl. No.: 11/560,098

(22) Filed: Nov. 15, 2006

(65) Prior Publication Data

US 2007/0122701 A1 May 31, 2007

(30) Foreign Application Priority Data

Nov. 18, 2005 (JP) ................ P2005-334162

(51) Int. Cl.
| | |
|---|---|
| *H01M 4/58* | (2010.01) |
| *H01M 10/40* | (2006.01) |
| *H01M 10/0569* | (2010.01) |
| *H01M 4/131* | (2010.01) |
| *H01M 4/134* | (2010.01) |
| *H01M 4/485* | (2010.01) |
| *H01M 10/0587* | (2010.01) |
| *H01M 4/38* | (2006.01) |

(52) U.S. Cl.
CPC ...... *H01M 10/0569* (2013.01); *H01M 4/131* (2013.01); *H01M 4/134* (2013.01); *H01M 4/386* (2013.01); *H01M 4/387* (2013.01); *H01M 4/485* (2013.01); *H01M 10/0587* (2013.01)

(58) Field of Classification Search
USPC ..................................... 429/218.1
See application file for complete search history.

(56) References Cited

U.S. PATENT DOCUMENTS

| | | | |
|---|---|---|---|
| 4,950,566 A | 8/1990 | Huggins et al. | |
| 6,365,299 B1 * | 4/2002 | Miyaki et al. | 429/218.1 |
| 2005/0214644 A1 * | 9/2005 | Aramata et al. | 429/218.1 |
| 2005/0250008 A1 * | 11/2005 | Mizutani et al. | 429/209 |
| 2006/0068285 A1 * | 3/2006 | Yamaguchi et al. | 429/218.1 |
| 2006/0147797 A1 * | 7/2006 | Wu | H01M 4/0428 |
| | | | 429/218.1 |

FOREIGN PATENT DOCUMENTS

| | | |
|---|---|---|
| JP | 2000-012018 A | 1/2000 |
| JP | 2000-012092 A | 1/2000 |
| JP | 2004-319469 A | 11/2004 |

(Continued)

OTHER PUBLICATIONS

M. Kobayashi et al., Journal or Fluorine Chemistry, Oct. 11, 2002, Science Direct, 120, pp. 105-110.*

(Continued)

*Primary Examiner* — Barbara Gilliam
*Assistant Examiner* — Adam A Arciero
(74) *Attorney, Agent, or Firm* — Dentons US LLP

(57) ABSTRACT

An anode material capable of obtaining a high capacity and superior charge-discharge efficiency, and an anode and a battery using the anode material are provided. An anode includes an anode material including an active portion including at least one of silicon and tin as an element and a coating portion of a metal oxide arranged on a part of a surface of the active portion. The ratio of the coating portion to the active portion is within a range from 0.01 wt % to 10 wt % inclusive. Thereby, a high capacity and superior charge-discharge efficiency can be obtained.

20 Claims, 6 Drawing Sheets

(56) References Cited

FOREIGN PATENT DOCUMENTS

| | | | |
|---|---|---|---|
| JP | 2004-335334 | | 11/2004 |
| JP | 2005289767 A | * | 10/2005 |
| JP | 2005-317400 A | | 11/2005 |
| JP | 2006-190642 A | | 7/2006 |
| WO | WO 2004/100291 | * | 11/2004 |

OTHER PUBLICATIONS

IPDL PAJ JPO Machine Translation for JP 2005289767 A (Oct. 20, 2005), Sekiguchi et al.*

Japanese Patent Office, Office Action issued in Patent Application JP 2005-334162, on Oct. 27, 2009.

* cited by examiner

ANODE MATERIAL, ANODE AND BATTERY

CROSS REFERENCES TO RELATED APPLICATIONS

The present invention contains subject matter related to Japanese Patent Application JP 2005-334162 filed in the Japanese Patent Office on Nov. 18, 2005, the entire contents of which being incorporated herein by reference.

BACKGROUND OF THE INVENTION

1. Field of the Invention

The present invention relates to an anode material including at least one of silicon (Si) and tin (Sn) as an element, and an anode and a battery using the anode material.

2. Description of the Related Art

In recent years, a large number of portable electronic devices such as camcorders, digital still cameras, cellular phones, personal digital assistants and laptop computers have been emerged, and an attempt to reduce the size and the weight of them has been made. Accordingly, the development of lightweight secondary batteries capable of obtaining a higher energy density has been promoted. Among the batteries, a lithium-ion secondary battery using a carbon material for an anode, a composite material of lithium and a transition metal for a cathode and a carbonate for an electrolytic solution can obtain a high energy density, compared to a lead-acid battery and a nickel cadmium battery in related arts, so the lithium-ion secondary battery has been widely put into practical use.

Moreover, recently a further improvement in capacity of batteries has been desired according to the enhancement of performance of portable electronic devices, and the use of tin or silicon as an anode active material instead of the carbon material has been studied (for example, refer to U.S. Pat. No. 4,950,566). It is because the theoretical capacities of tin and silicon are 994 mAh/g and 4199 mAh/g, respectively, which are much larger than the theoretical capacity of graphite of 372 mAh/g, therefore, an improvement in capacity can be expected.

However, a tin alloy or a silicon alloy including lithium (Li) has high activity, so an electrolyte solution is easily decomposed, and lithium is inactivated. Therefore, when charge and discharge are repeated, charge-discharge efficiency declines, thereby it is difficult to obtain sufficient cycle characteristics.

Accordingly, techniques to form a film made of an oxide of silicon, titanium (Ti), aluminum (Al) or zirconium (Zr) on a surface of an anode active material by a sol-gel method have been proposed (for example, refer to Japanese Unexamined Patent Application Publication Nos. 2004-335334 and 2004-335335).

SUMMARY OF THE INVENTION

However, in the above techniques, there is an issue that the ratio of an oxide is large, and the thickness of a film is thicker, thereby an energy density per volume declines. Moreover, there is an issue that an increase in the thickness of the film leads to a decline in charge-discharge efficiency.

In view of the foregoing, it is desirable to provide an anode material capable of obtaining a high capacity and superior charge-discharge efficiency, and an anode and a battery using the anode material.

According to an embodiment of the invention, there is provided an anode material including: an active portion including at least one of silicon and tin; and a coating portion of a metal oxide arranged on a part of a surface of the active portion, wherein the ratio of the coating portion to the active portion is within a range from 0.01 wt % to 10 wt % inclusive.

According to an embodiment of the invention, there is provided an anode including: an anode material including an active portion including at least one of silicon and tin, and a coating portion of a metal oxide arranged on a part of a surface of the active portion, wherein the ratio of the coating portion to the active portion is within a range from 0.01 wt % to 10 wt % inclusive.

According to an embodiment of the invention, there is provided a battery including: a cathode; an anode; and an electrolyte, wherein the anode includes an anode material, the anode material including an active portion including at least one of silicon and tin, and a coating portion of a metal oxide arranged on a part of a surface of the active portion, wherein the ratio of the coating portion to the active portion is within a range from 0.01 wt % to 10 wt % inclusive.

In the anode material according to the embodiment of the invention, an active portion including at least one of silicon and tin and a coating portion of a metal oxide arranged on a part of a surface of the active portion are included, and the ratio of the coating portion to the active portion is within a range from 0.01 wt % to 10 wt % inclusive, so while preventing a decline in volume energy density, chemical stability can be improved, and an electrode reactant can be smoothly inserted and extracted. Therefore, in the anode and the battery according to the embodiment of the invention which use the anode material, a high capacity and superior charge-discharge efficiency can be obtained.

Other and further objects, features and advantages of the invention will appear more fully from the following description.

DETAILED DESCRIPTION OF THE PREFERRED EMBODIMENTS

Figure 1:
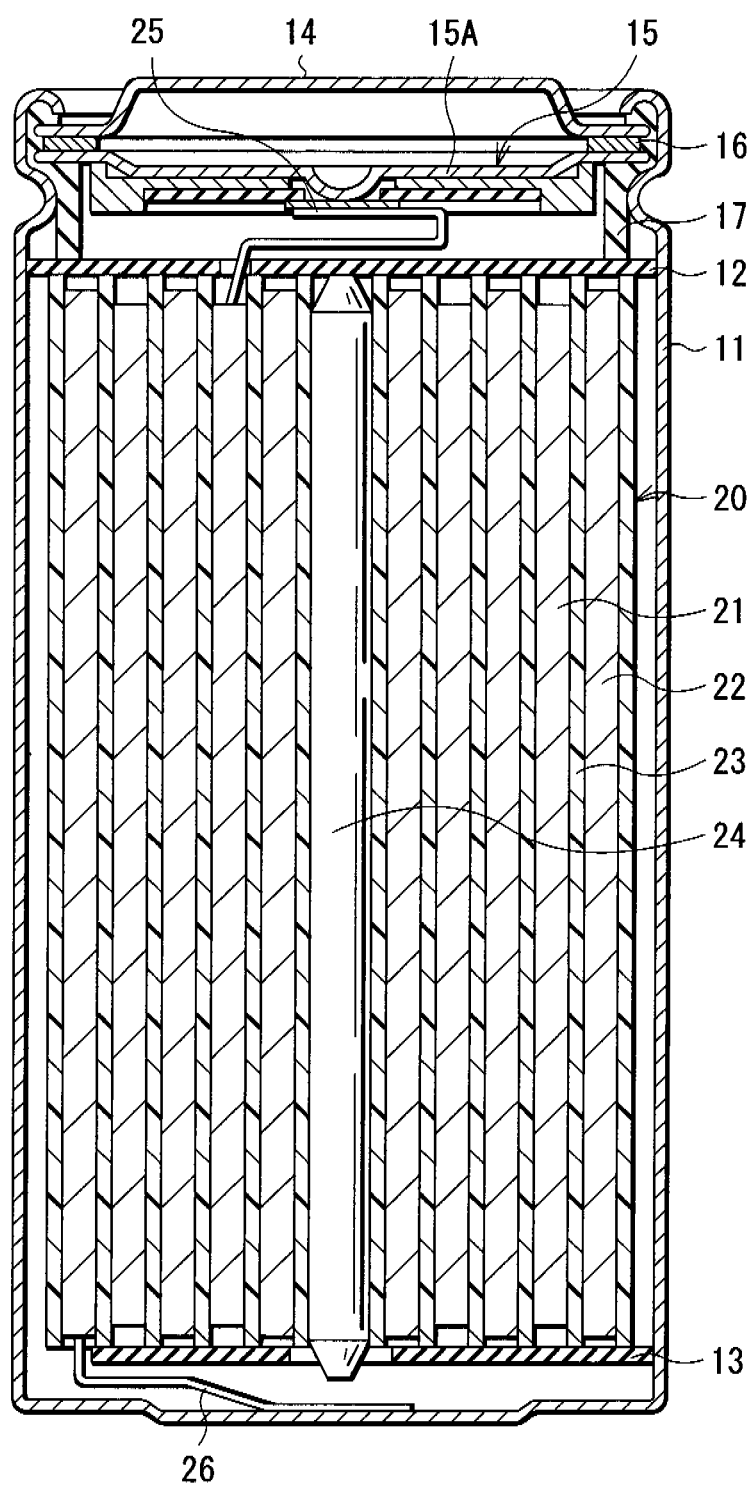
FIG. 1 is a sectional view of a first secondary battery according to an embodiment of the invention.

Preferred embodiments will be described in detail below referring to the accompanying drawings.

First Embodiment

An anode material according to a first embodiment of the invention includes an active portion including at least one of silicon and tin as an element and a coating portion of a metal oxide arranged on a part of a surface of the active portion. It is because silicon and tin have a high capability of inserting and extracting lithium, and can obtain a high energy density. Moreover, it is because when the coating portion is included, the chemical stability of the anode material can be improved. Further, it is because the anode material has an exposed portion where the coating portion is not arranged in a part of the surface of the active portion, so lithium or the like can be smoothly inserted and extracted.

Examples of such an active portion includes the simple substance, an alloy or a compound of silicon, the simple substance, an alloy or a compound of tin, and a material including a phase including one kind or two or more kinds of them at least in part. The active portion may include only one kind or a mixture of a plurality of kinds selected from them. In the invention, the alloy includes an alloy including one or more kinds of metal elements and one or more kinds of metalloid elements in addition to an alloy including two or more kinds of metal elements. Further, the alloy may include a non-metal element. As the texture of the alloy, a solid solution, a eutectic (eutectic mixture), an intermetallic compound or the coexistence of two or more kinds selected from them is cited.

As an alloy of silicon, for example, an alloy including at least one kind selected from the group consisting of tin, nickel (Ni), copper (Cu), iron (Fe), cobalt (Co), manganese (Mn), zinc (Zn), indium (In), silver (Ag), titanium, germanium (Ge), bismuth (Bi), antimony (Sb) and chromium (Cr) as a second element except for silicon is cited. As an alloy of tin, for example, an alloy including at least one kind selected from the group consisting of silicon, nickel, copper, iron, cobalt, manganese, zinc, indium, silver, titanium, germanium, bismuth, antimony and chromium as a second element except for tin is cited.

As a compound of silicon or a compound of tin, for example, a compound including oxygen (O) or carbon (C) is cited, and the compound may include the above-described second element in addition to tin or silicon.

Among them, the active portion preferably includes a SnCoC-containing material in which tin, cobalt and carbon are included as elements, and the carbon content is within a range from 9.9 wt % to 29.7 wt % inclusive, and the ratio Co/(Sn+Co) of cobalt to the total of tin and cobalt is within a range from 30 wt % to 70 wt % inclusive, because a high energy density and superior cycle characteristics can be obtained within such a composition range.

The SnCoC-containing material may further include any other element, if necessary. As the element, for example, silicon, iron, nickel, chromium, indium, niobium (Nb), germanium, titanium, molybdenum (Mo), aluminum, phosphorus (P), gallium (Ga) or bismuth is preferable, and two or more kinds selected from them may be included. It is because the capacity and the cycle characteristics can be further improved.

The SnCoC-containing material includes a phase including tin, cobalt and carbon, and the phase preferably has a low crystalline structure or an amorphous structure. Moreover, in the SnCoC-containing material, at least a part of carbon as an element is preferably bonded to a metal element or a metalloid element as another element. It is considered that a decline in the cycle characteristics is caused by cohesion or crystallization of tin or the like; however, when carbon is bonded to another element, such cohesion or crystallization can be inhibited.

As a measuring method for checking the bonding state of an element, for example, X-ray photoelectron spectroscopy (XPS) is used. In XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the SnCoC-containing material is observed in a region lower than 284.5 eV, at least a part of carbon included in the SnCoC-containing material is bonded to the metal element or the metalloid element which is another element.

Moreover, in the XPS measurement, for example, the peak of C1s is used to correct the energy axis of a spectrum. In general, surface contamination carbon exists on a surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the SnCoC-containing material, so the peak of the surface contamination carbon and the peak of the carbon in the SnCoC-containing material are separated through analyzing the waveform through the use of, for example, commercially available software. In the analysis of the waveform, the position of a main peak existing on a lowest binding energy side is used as an energy reference (284.8 eV).

Such an active portion can be manufactured, for example, by mixing the materials of all elements to form a mixture, melting the mixture in an electric furnace, a high-frequency induction furnace, an arc furnace or the like, and then solidifying the mixture, or by various atomization methods such as gas atomization or water atomization, various roll methods, or methods using a mechanochemical reaction such as a mechanical alloying method or a mechanical milling method. The active portion is preferably manufactured by the method using a mechanochemical reaction, because the active portion can have a low crystalline structure or an amorphous structure. In this method, for example, a manufacturing apparatus such as a planetary ball mill or an attritor can be used.

The ratio of the coating portion to the active portion (the coating portion/the active portion) is within a range from 0.01 wt % to 10 wt % inclusive. When the ratio of the coating portion is too low, an effect of improving chemical stability is not sufficient, and when the ratio of the coating portion is too high, the energy density and the charge-discharge efficiency decline.

As the metal oxide making up the coating portion, for example, an oxide including at least one kind selected from the group consisting of titanium, zirconium, hafnium (Hf), vanadium (V), niobium, tantalum (Ta), chromium, molybdenum, tungsten (W), manganese, iron, ruthenium (Ru), cobalt, rhodium (Rh), iridium (Ir), nickel, palladium (Pd), cerium (Ce), indium, silicon, germanium, tin and bismuth as an element is cited. The coating portion may be made of only one kind or a mixture of a plurality of kinds selected from these oxides.

The coating portion can be formed through depositing the metal oxide by, for example, a liquid-phase deposition method, an electrodeposition method, a dip coating method, an evaporation method, a sputtering method, a CVD (Chemical Vapor Deposition) method or the like.

The coating portion is preferably formed by the liquid-phase deposition method among them, because the deposition of an extremely small amount of the metal oxide can be easily controlled. The liquid-phase deposition method is a method of depositing the metal oxide on a surface of a material including at least one of silicon and tin as an element to form the coating portion through adding a dissolved species which easily coordinates fluorine (F) as an anion trapping agent into a metal fluoride complex solution to mix them, and immersing the material including at least one of silicon and tin as an element in the mixture, and then trapping a fluorine anion generated from the metal fluoride complex by the dissolved species. Instead of the metal fluoride complex, for example, a metal compound generating another anion such as a sulfate ion may be used.

The ratio of the metal element making up the metal oxide to silicon and tin in the surface of the anode material is preferably within a range from 0.1 at % to 20 at % inclusive. It is because when the ratio of the metal element making up the coating portion is too low, an effect of improving chemical stability is not sufficient, and when the ratio of the metal element making up the coating portion is too high, the energy density and the charge-discharge efficiency decline. In addition, the ratio of the metal element can be measured by, for example, X-ray photoelectron spectroscopy.

For example, the anode material can be used in a first secondary battery as described below.

(First Secondary Battery)

FIG. 1 shows a sectional view of a first secondary battery according to the embodiment of the invention. The secondary battery is a so-called cylindrical type, and includes a spirally wound electrode body 20 including a strip-shaped cathode 21 and a strip-shaped anode 22 which are laminated and spirally wound with a separator 23 in between in a substantially hollow cylindrical-shaped battery can 11. The battery can 11 is made of, for example, nickel-plated iron. An end portion of the battery can 11 is closed, and the other end portion thereof is opened. An electrolyte solution is injected into the battery can 11 to impregnate the separator 23 with the electrolyte solution. Moreover, a pair of insulating plates 12 and 13 are disposed so that the spirally wound electrode body 20 is sandwiched therebetween in a direction perpendicular to a peripheral winding surface.

In the opened end portion of the battery can 11, a battery cover 14 and, a safety valve mechanism 15 and a PTC device (positive temperature coefficient device) 16 disposed inside the battery cover 14 are mounted through caulking by a gasket 17, and the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, a center pin 24 is inserted in the center of the spirally wound electrode body 20. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
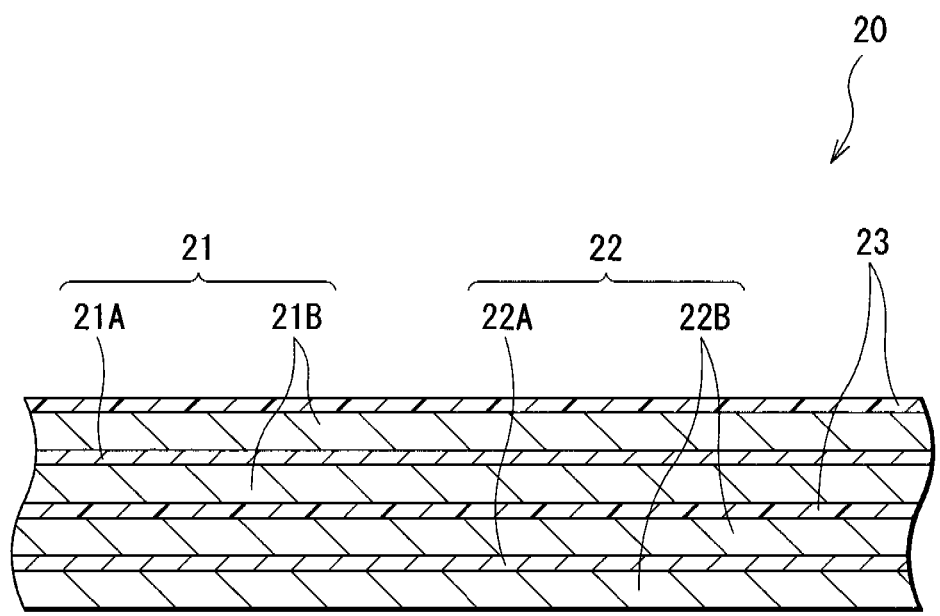
FIG. 2 is an enlarged sectional view of a part of a spirally wound electrode body in the secondary battery shown in FIG. 1.

FIG. 2 shows an enlarged view of a part of the spirally wound electrode body 20 shown in FIG. 1. The cathode 21 has, for example, a structure in which a cathode active material layer 21B is disposed on both sides of a cathode current collector 21A having a pair of facing surfaces. The cathode current collector 21A is made of, for example, metal foil such as aluminum foil.

The cathode active material layer 21B includes, for example, one kind or two or more kinds of cathode materials capable of inserting and extracting lithium as cathode active materials, and the cathode active material layer 21B may include an electrical conductor such as a carbon material and a binder such as polyvinylidene fluoride, if necessary. Examples of the cathode materials capable of inserting and extracting lithium include chalcogenide not including lithium such as titanium sulfide ($TiS_2$), molybdenum sulfide ($MoS_2$), niobium selenide ($NbSe_2$) or vanadium oxide ($V_2O_5$) and a lithium-containing compound.

Among them, the lithium-containing compound is preferable, because a high voltage and a high energy density can be obtained. Examples of such a lithium-containing compound include a complex oxide including lithium and a transition metal element and a phosphate compound including lithium and a transition metal element, and a lithium complex oxide or a phosphate compound including at least one kind selected from the group consisting of cobalt, nickel, manganese and iron as the transition metal element is more preferable, because a higher voltage can be obtained. The chemical formulas of the lithium complex oxide and the phosphate compound are represented by, for example, $Li_xMIO_2$ and $Li_yMIIPO_4$, respectively. In the formulas, MI and MII represent one or more kinds of transition metal elements. In the formulas, the values of x and y depend upon a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ (z<1)), lithium-nickel-cobalt-manganese complex oxide ($Li_xNi_{(1-v-w)}Co_vMn_wO_2$ (v+w<1)), lithium-manganese complex oxide ($LiMn_2O_4$) having a spinel structure and the like. Among them, a complex oxide including nickel is preferable, because a high capacity can be obtained, and superior cycle characteristics can be obtained. Specific examples of the phosphate compound including lithium and a transition metal element include lithium-iron phosphate compound ($LiFePO_4$) and lithium-iron-manganese phosphate compound ($LiFe_{1-u}Mn_uPO_4$ (u<1)).

The anode 22 has, for example, a structure in which an anode active material layer 22B is disposed on both sides of an anode current collector 22A having a pair of facing surfaces as in the case of the cathode 21. The anode current collector 22A is made of, for example, metal foil such as copper foil.

The anode active material layer 22B includes the above-described anode material. Thereby, the energy density per volume is improved, and the chemical stability in the anode 22 is improved, and the decomposition of the electrolyte solution can be prevented. Moreover, lithium can be smoothly inserted and extracted. Therefore, a high capacity and superior charge-discharge efficiency can be obtained.

The anode active material layer 22B may include any other anode active material, or another material such as an electrical conductor in addition to the above-described anode material. As the other material, for example, a carbonaceous material capable of inserting and extracting lithium is cited. The carbonaceous material is preferable, because the carbonaceous material can improve the charge-discharge cycle characteristics, and functions as an electrical conductor. As the carbonaceous material, for example, one kind or two or more kinds selected from the group consisting of non-graphitizable carbon, graphitizable carbon, graphite, kinds of pyrolytic carbon, kinds of coke, kinds of glass-like carbon, a fired organic polymer body, activated carbon, and carbon black can be used. Among them, kinds of coke include pitch coke, needle coke, petroleum coke and the like, and the fired organic polymer body is formed through firing a polymer compound such as a phenolic resin or a furan resin at an appropriate temperature to carbonize the polymer compound. The carbonaceous materials may have a fiber form, a spherical form, a particle form or a scale form.

The separator 23 isolates between the cathode 21 and the anode 22 so as to pass lithium ions through while preventing a short circuit of a current due to contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The electrolyte solution with which the separator 23 is impregnated includes a solvent and an electrolyte salt dissolved in the solvent.

Examples of the solvent include carbonates, esters, ethers, lactones, nitrites, amides and sulfones. More specifically, a nonaqueous solvent such as ethylene carbonate, propylene carbonate, butylene carbonate, vinylene carbonate, γ-butyrolactone, γ-valerolactone, diethyl carbonate, dimethyl carbonate, ethyl methyl carbonate, 1,2-dimethoxyethane, tetrahydrofuran, 2-methyltetrahydrofuran, 1,3-dioxolane, 4-methyl-1,3-dioxolane, acetate, butyrate, propionate, acetonitrile, glutaronitrile, adiponitrile or methoxyacetonitrile is cited. As the solvent, only one kind, or a mixture of a plurality of kinds selected from them may be used.

The solvent preferably includes a fluorinated carbonate, because a good film can be formed on the surface of an electrode, and the decomposition of the electrolyte solution can be further prevented. As such a fluorinated carbonate, 4-fluoro-1,3-dioxolane-2-one, 4,5-difluoro-1,3-dioxolane-2-one, fluoromethyl methyl carbonate, bis(fluoromethyl) carbonate or difluoromethyl methyl carbonate is preferable, because a higher effect can be obtained. As the fluorinated carbonate, only one kind, or a mixture of a plurality of kinds selected from them may be used.

Examples of the electrolyte salt include lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($LiCF_3SO_3$), lithium bis[trifluoromethanesulfonyl]imide (($CF_3SO_2)_2NLi$), lithium tris(trifluoromethanesulfonyl)methyl (($CF_3SO_2)_3CLi$), lithium tris(pentafluoroethyl)trifluorophosphate ($LiP(C_2F_5)_3F_3$), lithium (trifluoromethyl)trifluoroborate ($LiB(CF_3)F_3$), lithium pentafluoroethyltrifluoroborate ($LiB(C_2F_5)F_3$) and lithium bis[pentafluoroethanesulfonyl]imide (($C_2F_5SO_2)_2NLi$). As the electrolyte salt, only one kind, or a mixture of a plurality of kinds selected from them may be used.

The secondary battery can be manufactured by the following steps, for example.

At first, for example, the cathode active material layer 21B is formed on the cathode current collector 21A to form the cathode 21. The cathode active material layer 21B is formed by the following steps, for example. The cathode active material, the electrical conductor and the binder are mixed to form a cathode mixture, and then the cathode mixture is dispersed in a solvent such as N-methyl-2-pyrrolidone to form paste-form cathode mixture slurry. The cathode mixture slurry is applied to the cathode current collector 21A, and the cathode mixture slurry is dried, and compression molded, thereby the cathode active material layer 21B is formed.

Moreover, for example, the anode 22 is formed through forming the anode active material layer 22B on the anode current collector 22A. The anode active material layer 22B is formed by the following steps, for example. The above-described anode material, the electrical conductor and the binder are mixed to from an anode mixture, and then the anode mixture is dispersed in a solvent such as N-methyl-2-pyrrolidone to form paste-form anode mixture slurry. The anode mixture slurry is applied to the anode current collector 22A, and the anode mixture slurry is dried and compression molded to form the anode active material layer 22B.

Next, the cathode lead 25 is attached to the cathode current collector 21A by welding or the like, and the anode lead 26 is attached to the anode current collector 22A by welding or the like. Then, the cathode 21 and the anode 22 is spirally wound with the separator 23 in between, and an end portion of the cathode lead 25 is welded to the safety valve mechanism 15, and an end portion of the anode lead 26 is welded to the battery can 11. Then, the cathode 21 and the anode 22 which are spirally wound are sandwiched between a pair of insulating plates 12 and 13, and then they are contained in the battery can 11. After the cathode 21 and the anode 22 are contained in the battery can 11, the electrolyte solution is injected into the battery can 11 to impregnate the separator 23 with the electrolyte solution. After that, the battery cover 14, the safety valve mechanism 15 and the PTC device 16 are fixed in an opened end portion of the battery can 11 through caulking by the gasket 17. Thereby, the secondary battery shown in FIGS. 1 and 2 is completed.

When the secondary battery is charged, for example, lithium ions are extracted from the cathode 21, and are inserted into the anode 22 through the electrolyte solution. When the secondary battery is discharged, for example, the lithium ions are extracted from the anode 22 and are inserted into the cathode 21 through the electrolyte solution. In this case, the anode 22 includes the anode material in which the active portion including at least one of silicon and tin as an element and the coating portion of the metal oxide arranged on a part of the surface of the active portion are included, and the ratio of the coating portion to the active portion is within a range from 0.01 wt % to 10 wt % inclusive, so the energy density per volume is improved, and the chemical stability in the anode 22 is improved, and the decomposition of the electrolyte solution is prevented. Moreover, lithium is smoothly inserted and extracted.

In the anode material according to the embodiment, the coating portion of the metal oxide is arranged on a part of the surface of the active portion including at least one of silicon and tin as an element, and the ratio of the coating portion to the active portion is within a range from 0.01 wt % to 10 wt % inclusive, so while preventing a decline in volume energy density, the chemical stability can be improved, and lithium or the like can be smoothly inserted and extracted. Therefore, in the secondary battery according to the embodiment which uses the anode material, a high capacity and superior charge-discharge efficiency can be obtained.

(Second Secondary Battery)

Figure 3:
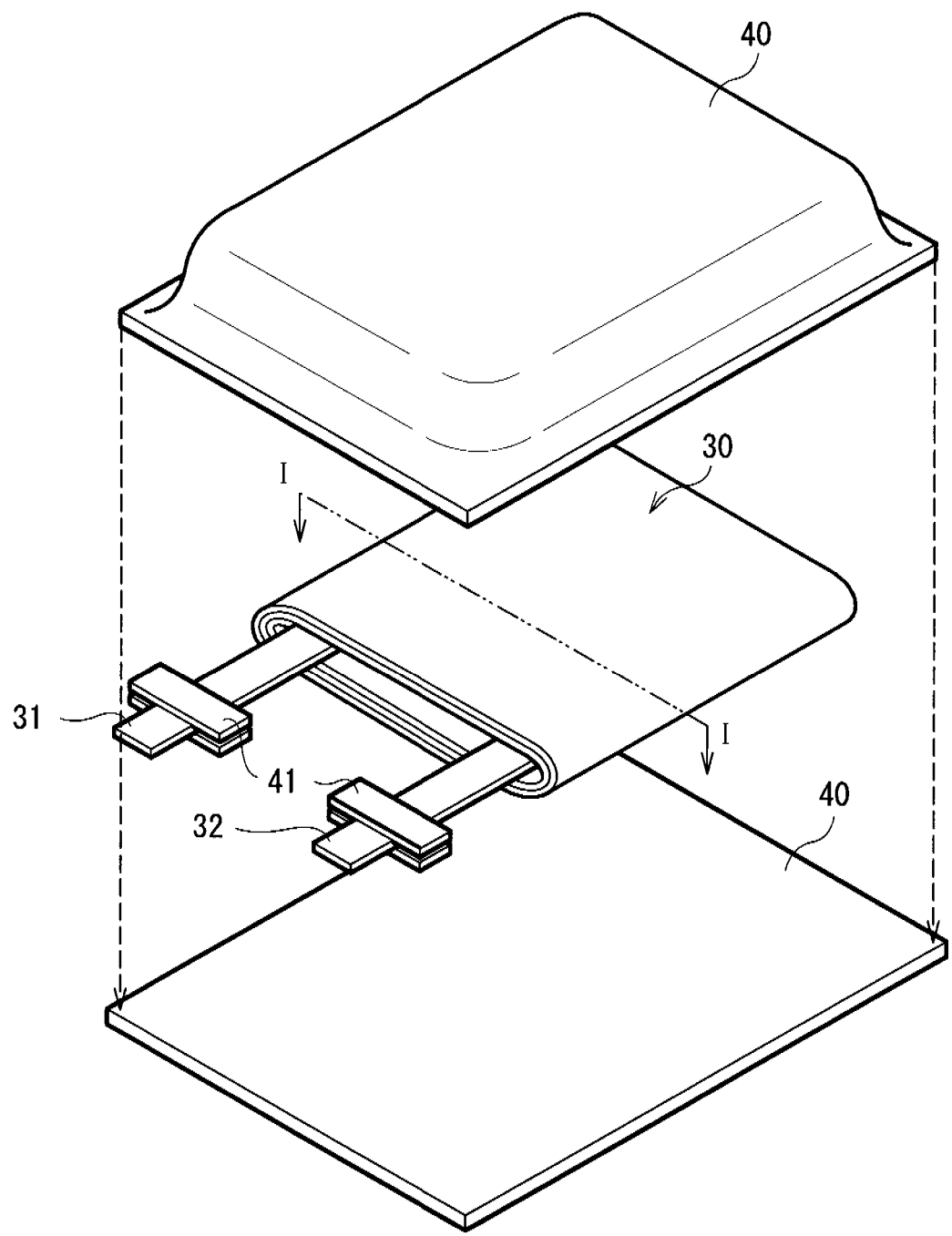
FIG. 3 is an exploded perspective view of a second secondary battery according to an embodiment of the invention.

FIG. 3 shows the structure of a second secondary battery. The secondary battery is a so-called laminate film type, and in the secondary battery, a spirally wound electrode body 30 to which a cathode lead 31 and an anode lead 32 are attached is contained in film-shaped package members 40.

The cathode lead 31 and the anode lead 32 are drawn from the interior of the package members 40 to outside, for example, in the same direction. The cathode lead 31 and the anode lead 32 are made of, for example, a metal material such as aluminum, copper, nickel or stainless, and have a thin plate form or a mesh form.

The package members 40 are made of, for example, a rectangular aluminum laminate film including a nylon film, aluminum foil and a polyethylene film laminated in this order. The package members 40 are disposed so that the polyethylene films of the package members 40 face the spirally wound electrode body 30, and edge portions of the package members 40 are adhered to each other by fusion bonding or an adhesive. An adhesive film 41 for preventing the entry of outside air is inserted between the package members 40, the cathode lead 31 and the anode lead 32. The adhesive film 41 is made of, for example, a material having adhesion to the cathode leads 31 and the anode lead 32, for example, a polyolefin resin such as polyethylene, polypropylene, modified polyethylene or modified polypropylene.

The package members 40 may be made of a laminate film with any other structure, a polymer film such as polypropylene or a metal film instead of the above-described aluminum laminate film.

Figure 4:
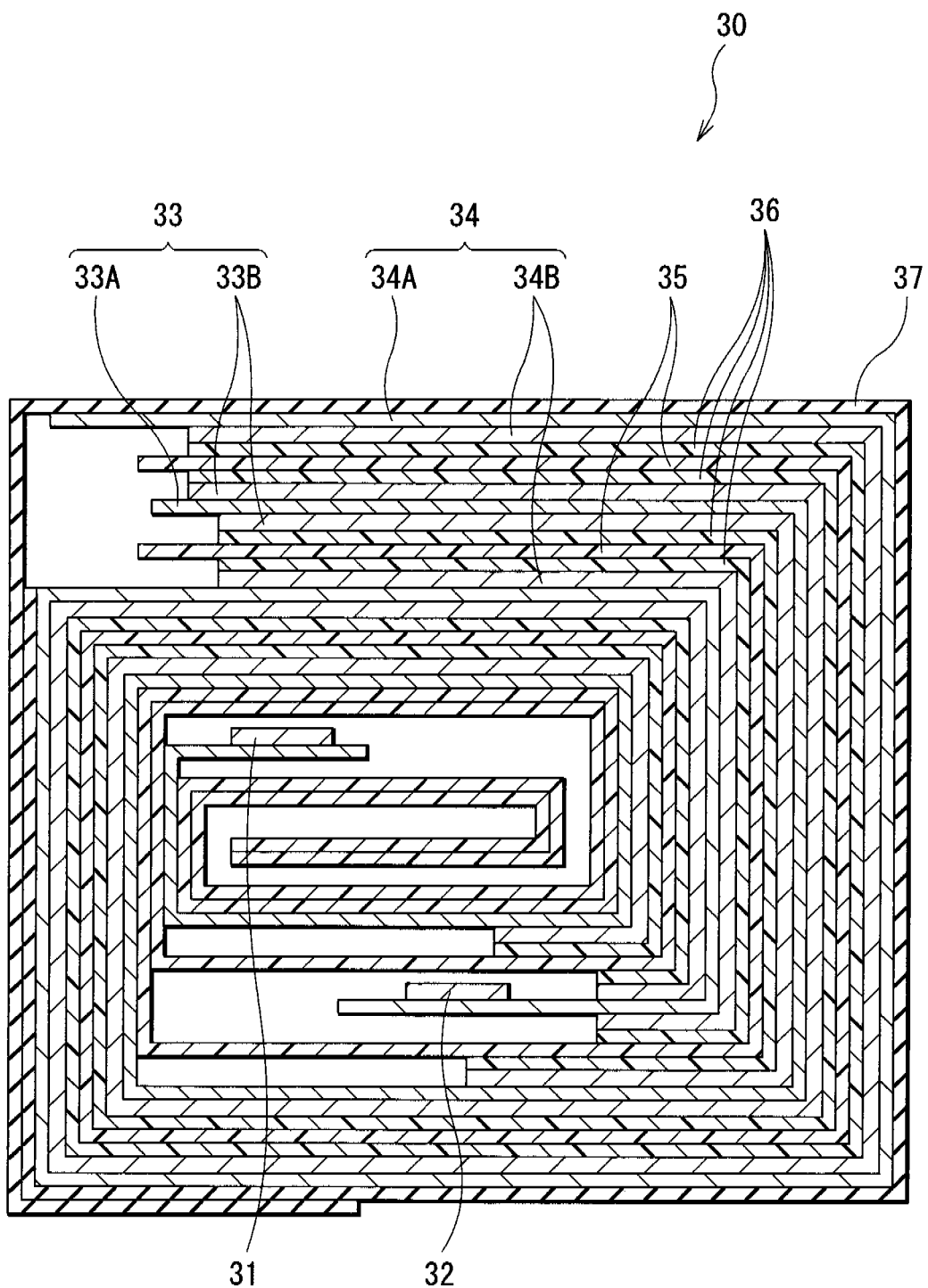
FIG. 4 is a sectional view of a spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is disposed on both sides of a cathode current collector 33A. The anode 34 has a structure in which an anode active material layer 34B is disposed on both sides of an anode current collector 34A, and the anode 34 is disposed so that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the first secondary battery, respectively.

The electrolyte layer 36 includes an electrolyte solution and a polymer compound as a holding body holding the electrolyte solution, and is a so-called gel electrolyte. The gel electrolyte is preferable, because the gel electrolyte can obtain high ion conductivity, and can prevent leakage of the battery. The structure of the electrolyte solution (that is, a solvent and an electrolyte salt) is the same as that in the first secondary battery. Examples of the polymer compound include an ether-based polymer compound such as polyethylene oxide or a cross-link including polyethylene oxide, an ester-based polymer compound such as polymethacrylate, an acrylate-based polymer compound, and a polymer of vinylidene fluoride such as a copolymer of polyvinylidene fluoride or vinylidene fluoride and hexafluoropropylene, and one kind or a mixture of two or more kinds selected from them is used. More specifically, in terms of stability of oxidation-reduction, the fluorine-based polymer compound such as a polymer of vinylidene fluoride is preferable.

The secondary battery can be manufactured by the following steps, for example.

At first, a precursor solution including the electrolyte solution, the polymer compound and a mixed solvent is applied to the cathode 33 and the anode 34, and the mixed solvent is volatilized to form the electrolyte layer 36. Next, the cathode lead 31 is attached to the cathode current collector 33A, and the anode lead 32 is attached to the anode current collector 34A. Then, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is adhered to an outermost portion of the laminate so as to form the spirally wound electrode body 30. After that, for example, the spirally wound electrode body 30 is sandwiched between the package members 40, and edge portions of the package members 40 are adhered to each other by thermal fusion bonding or the like to enclose the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be formed by the following steps. At first, as described above, the cathode 33 and the anode 34 are formed, and after the cathode lead 31 and the anode lead 32 are attached to the cathode 33 and the anode 34, the cathode 33 and the anode 34 are laminated with the separator 35 in between to form a laminate, and the laminate is spirally wound, and the protective tape 37 is adhered to an outermost portion of the laminate so as to form a spirally wound body as a precursor body of the spirally wound electrode body 30. Next, the spirally wound body is sandwiched between the package members 40, and the edge portions except for one side are adhered by thermal fusion bonding to form a bag shape. Thereby, the spirally wound body is contained in the package members 40. Next, a composite for an electrolyte including the electrolyte solution and monomers as the materials of the polymer compound and, if necessary, another material such as a polymerization initiator or a polymerization inhibitor is prepared, and the composite is injected into the interior of the package members 40. Then, an opening of the package members 40 is sealed by thermal fusion bonding. Next, the monomers are polymerized through applying heat to form a polymer compound, thereby the gel electrolyte layer 36 is formed, and the secondary battery shown in FIGS. 3 and 4 is assembled.

The secondary battery can function as in the case of the first secondary battery, and can have the same effects as those of the first secondary battery.

Second Embodiment

A secondary battery according to a second embodiment of the invention has the same structure, functions and effects as those in the first embodiment, except that the structures of anodes 22 and 34 are different, so the secondary battery can be manufactured in the same manner. Therefore, in the embodiment, FIGS. 1, 2, 3 and 4 are referred, and like components are denoted by like numerals as of the first embodiment, and will not be further described.

As in the case of the first embodiment, the anodes 22 and 34 have a structure in which anode active material layers 22B and 34B are disposed on both sides of anode current collectors 22A and 34A, respectively, and each of the anode active material layers 22B and 34B includes an anode material in which an active portion including at least one of silicon and tin as an element and a coating portion of a metal oxide arranged on a part of a surface of the active portion are included, and the ratio of the coating portion to the active portion is within a range from 0.01 wt % to 10 wt % inclusive. More specifically, the active portion includes the simple substance, an alloy or a compound of silicon, or the simple substance, an alloy or a compound of tin, and two or more kinds selected from them may be included.

Moreover, the anode active material layers 22B and 34B are formed through forming the active portion through the use of a vapor-phase method, a liquid-phase method or a firing method, or two or more methods of them, and then forming the coating portion, and the active portion and the anode current collectors 22A and 34A are preferably alloyed at least in a part of an interface between the active portion and the anode current collectors 22A and 34A. More specifically, it is preferable that the element of the anode current collectors 22A and 34A is diffused into the active portion, or the element of the active portion is diffused into the anode current collectors 22A and 34A, or they are diffused into each other in the interface. It is because a fracture in the anode active material layers 22B and 34B due to expansion and shrinkage thereof according to charge and discharge can be prevented, and the electronic conductivity between the anode active material layers 22B and 34B and the anode current collectors 22A and 34A can be improved.

As the vapor-phase method, for example, a physical deposition method or a chemical deposition method can be used, and more specifically, a vacuum deposition method, a sputtering method, an ion plating method, a laser ablation method, a thermal CVD (Chemical Vapor Deposition) method, a plasma CVD method, a spraying method or the like can be used. As the liquid-phase method, a known technique such as an electrolytic plating method or an electroless plating method can be used. The firing method is, for example, a method of mixing a particulate anode active material with a binder or the like to form a mixture, dispersing the mixture into a solvent, applying the solvent, and then carrying out a heat treatment at a higher temperature than the melting point of the binder or the like. As the firing method, a known technique such as, for example, an atmosphere firing method, a reaction firing method or a hot press firing method can be used.

EXAMPLES

Specific examples of the invention will be described in detail below.

Examples 1-1 to 1-8

Figure 5:
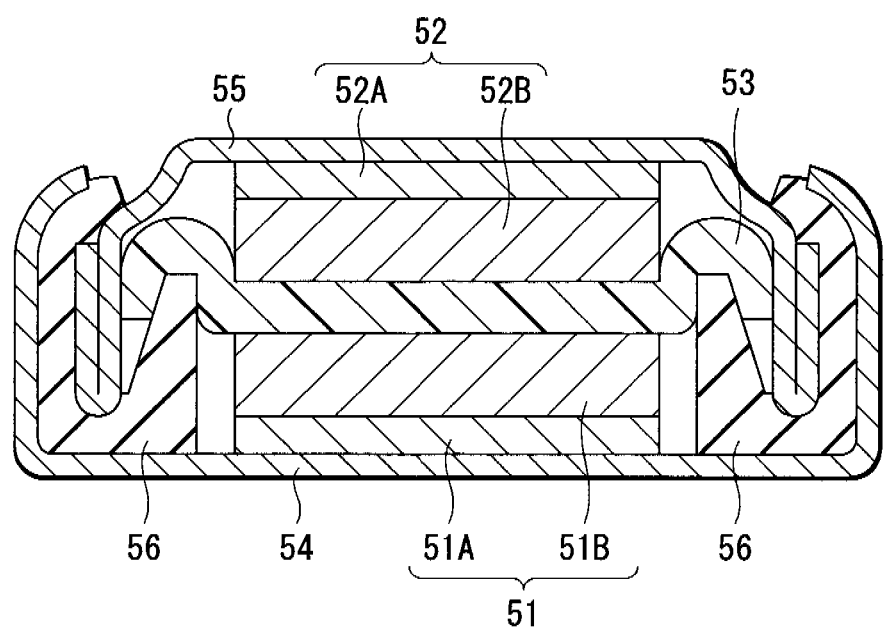
FIG. 5 is a sectional view of a secondary battery formed in an example.

Coin-type secondary batteries shown in FIG. 5 were formed. The secondary batteries were formed through laminating a cathode 51 and an anode 52 with a separator 53 impregnated with an electrolyte solution to form a laminate, sandwiching the laminate between a package can 54 and a package cup 55, and then caulking by a gasket 56.

At first, after the active portion was formed on an anode current collector 52A made of copper foil with a thickness of 10 μm by an electron beam evaporation method, the anode current collector 52A was stamped into a pellet with a diameter of 16 mm.

Next, in Examples 1-1 through 1-5, the anode current collector 52A on which silicon was deposited was immersed in a solvent formed through dissolving boric acid as a fluorine anion trapping agent in ammonium hexafluorotitanate as a metal fluoride complex to deposit titanium oxide ($TiO_2$) on a surface of silicon, thereby a coating portion was formed to form the anode active material layer 52B. At that time, the concentrations of ammonium hexafluorotitanate and boric acid were 0.02 mol/l and 0.2 mol/l, respectively in Example 1-1, and 0.05 mol/l and 0.15 mol/l, respectively in Examples 1-2 through 1-5. Moreover, the immersing time was 0.5 hours in Example 1-1, 1 hour in Example 1-2, 3 hours in Example 1-3, 6 hours in Example 1-4, and 12 hours in Example 1-5. After that, the anode current collector 52A was cleaned with water, and dried under reduced pressure so as to form the anode 52.

Moreover, in Example 1-6 through 1-8, the anode current collector 52A on which silicon was deposited was immersed in a solution formed through immersing an aluminum plate with a surface area of 48 $cm^2$ as a fluorine anion trapping agent in a dihydrogen hexafluorozirconate solution as a metal fluoride complex, and then leaving for 3 hours to deposit zirconium oxide ($ZrO_2$) on a surface of silicon, thereby the coating portion was formed to form the anode active material layer 52B. At that time, the concentration of dihydrogen hexafluorozirconate was 0.06 mol/l. Moreover, the immersing time was 1 hour in Example 1-6, 3 hours in Example 1-7, and 6 hours in Example 1-8. After that, the anode active material layer 52B was cleaned with water, and dried under reduced pressure so as to form the anode 52.

The formed anode 52 was used to determine the ratio of the coating portion made of $TiO_2$ or $ZrO_2$ to the active portion made of silicon by ICP-AES (Inductively Coupled Plasma-Atomic Emission Spectroscopy). The results are shown in Table 1. Moreover, XPS was performed on the surface of the anode 52 to determine the atom ratio of titanium or zirconium to silicon. The results are shown in Table 1.

Moreover, lithium carbonate ($Li_2CO_3$) and cobalt carbonate ($CoCO_3$) were mixed at a molar ratio of $Li_2CO_3$:$CoCO_3$=0.5:1 to form a mixture, and the mixture was fired for 5 hours at 900° C. in air to obtain lithium-cobalt complex oxide ($LiCoO_2$) as a cathode active material. Next, after 91 parts by weight of lithium-cobalt complex oxide, 6 parts by weight of graphite as an electrical conductor and 3 parts by weight of polyvinylidene fluoride were mixed to form a cathode mixture, the cathode mixture was dispersed in N-methyl-2-pyrrolidone as a solvent to form cathode mixture slurry. Then, after the cathode mixture slurry was applied to both sides of the cathode current collector 51A made of aluminum foil with a thickness of 20 μm, and was dried, the cathode mixture slurry was compression molded to form the cathode active material layer 51B. After that, the cathode current collector 51A on which the cathode active material layer 51B was formed was stamped into a pellet with a diameter of 15.5 mm to form the cathode 51.

Next, a laminate including the formed cathode 51 and the formed anode 52 with the separator 53 made of a microporous polypropylene film in between was mounted on the package can 54, and the electrolyte solution was injected onto the laminate, and the package cup 55 was put on the laminate, and the laminate was sealed in the package can 54 and the package cup 55 by caulking. As the electrolyte solution, an electrolyte solution formed through dissolving 1 mol/l of lithium hexafluorophosphate as an electrolyte salt in a solvent formed through mixing 4-fluoro-1,3-dioxolane-2-one and diethyl carbonate at a weight ratio of 1:1.

As Comparative Example 1-1 relative to Examples 1-1 through 1-8, an anode was formed as in the case of Examples 1-1 through 1-8, except that the coating portion was not formed, and a secondary battery using the anode was formed. Moreover, as Comparative Example 1-2, a secondary battery was formed as in the case of Example 1-1 through 1-5, except that the time for immersing the anode current collector on which silicon was deposited in a solvent formed through dissolving boric acid in ammonium hexafluorotitanate was changed, and $TiO_2$ was deposited on a surface of silicon to form the coating portion, thereby the anode active material layer was formed. At that time, the immersing time was 31 hours. Moreover, the anode of Comparative Example 1-2 was used to determine the ratio of the coating portion made of $TiO_2$ to the active portion made of silicon by ICP-AES, and XPS was performed on the anode of the comparative Example 1-2 to determine the atom ratio of titanium to silicon. The results are shown in Table 1.

The cycle characteristics of the secondary batteries of Examples 1-1 through 1-8 and Comparative Examples 1-1 and 1-2 were measured. 100 charge-discharge cycles were performed at 23° C., and then the discharge capacity retention ratio (%) in the 100th cycle in the case where the discharge capacity in the second cycle was 100 was determined as the cycle characteristics. At that time, the secondary batteries were charged at a constant current density of 1 mA/cm² until the battery voltage reached 4.2 V, and then the secondary batteries were charged at a constant voltage of 4.2 V until the current density reached 0.02 mA/cm². The secondary batteries were discharged at a constant current density of 1 mA/cm² until the battery voltage reached 2.5 V. The results are shown in Table 1.

TABLE 1

Battery shape; Coin type

| | MANUFACTURING CONDITIONS | | | | |
|---|---|---|---|---|---|
| | METAL FLUORIDE COMPLEX | | FLUORINE ANION TRAPPING AGENT | | IMMERSING |
| | KIND | Mol/l | KIND | Mol/l | TIME |
| EXAMPLE 1-1 | AMMONIUM HEXAFLUOROTITANATE | 0.02 | BORIC ACID | 0.2 | 0.5 |
| EXAMPLE 1-2 | | 0.05 | | 0.15 | 1 |
| EXAMPLE 1-3 | | 0.05 | | 0.15 | 3 |
| EXAMPLE 1-4 | | 0.05 | | 0.15 | 6 |
| EXAMPLE 1-5 | | 0.05 | | 0.15 | 12 |
| EXAMPLE 1-6 | DIHYDROGEN HEXAFLUOROZIRCONATE | 0.06 | ALUMINUM PLATE | | 1 |
| EXAMPLE 1-7 | | 0.06 | | | 3 |
| EXAMPLE 1-8 | | 0.06 | | | 6 |
| COMPARATIVE EXAMPLE 1-1 | — | 0 | — | 0 | 0 |
| COMPARATIVE EXAMPLE 1-2 | AMMONIUM HEXAFLUOROTITANATE | 0.05 | BORIC ACID | 0.15 | 31 |

| | ANODE MATERIAL | | | | DISCHARGE CAPACITY RETENTION RATIO (%) |
|---|---|---|---|---|---|
| | | COATING PORTION | | | |
| | ACTIVE PORTION | KIND | COATING AMOUNT (WT %) | SURFACE ATOM RATIO AT % | |
| EXAMPLE 1-1 | SILICON (ELECTRON BEAM EVAPORATION) | $TiO_2$ | 0.3 | Ti/Si 1.0 | 78 |
| EXAMPLE 1-2 | | | 0.2 | 1.5 | 79 |
| EXAMPLE 1-3 | | | 0.2 | 2.3 | 80 |
| EXAMPLE 1-4 | | | 0.9 | 2.9 | 78 |
| EXAMPLE 1-5 | | | 4.1 | 17 | 77 |
| EXAMPLE 1-6 | | $ZrO_2$ | 0.2 | Zr/Si 0.8 | 79 |
| EXAMPLE 1-7 | | | 0.5 | 1.3 | 80 |
| EXAMPLE 1-8 | | | 0.8 | 2.0 | 78 |
| COMPARATIVE EXAMPLE 1-1 | SILICON (ELECTRON BEAM EVAPORATION) | — | — | — | 76 |
| COMPARATIVE EXAMPLE 1-2 | | $TiO_2$ | 14 | Ti/Si 40 | 72 |

As shown in Table 1, in Examples 1-1 through 1-5 in which the ratio of the coating portion made of $TiO_2$ to the active portion made of silicon was within a range from 0.01 wt % to 10 wt % inclusive, and the ratio of titanium to silicon in the surface of the anode was within a range from 0.1 at % to 20 at % inclusive, the discharge capacity retention ratio was improved, compared to Comparative Example 1-1 in which the coating portion was not arranged or Comparative Example 1-2 in which the ratio of the coating portion made of $TiO_2$ to the active portion made of silicon was larger than 10 wt %, and the ratio of titanium to silicon in the surface of the anode was larger than 20 at %. Moreover, in Examples 1-6 through 1-8 in which the coating portion made of $ZrO_2$ was included, a high discharge capacity retention ratio was obtained in a like manner.

In other words, it was found out that when the anode material including the active portion including silicon as an element and the coating portion of a metal oxide arranged on a part of the surface of the active portion was used, and the ratio of the coating portion to the active portion was within a range from 0.01 wt % to 10 wt % inclusive, and the ratio of a metal element making up the metal oxide to silicon in the surface of the anode was within a range from 0.1 at % to 20 at % inclusive, the cycle characteristics could be improved.

Examples 2-1 to 2-7

In Examples 2-1 through 2-4, anode materials including an active portion made of silicon and a coating portion made of $TiO_2$ were formed through the following steps. Silicon powder with an average particle diameter of 1 μm was immersed in a solution formed through dissolving boric acid as a fluorine anion trapping agent in ammonium hexafluorotitanate as a metal fluoride complex so as to deposit $TiO_2$ on the surface of silicon, and the silicon powder was cleaned with water, and dried under reduced pressure to form each of the anode materials. At that time, the concentration of ammonium hexafluorotitanate, the concentration of boric acid and the immersing time were the same as those in Examples 1-1 through 1-4.

Moreover, in Examples 2-5 through 2-7, anode materials including the active portion made of silicon and the coating portion made of $ZrO_2$ were formed through the following steps. Silicon power with an average particle diameter of 1 μm was stirred and immersed in a solution formed through immersing an aluminum plate with a surface area of 48 cm$^2$ as a fluorine anion trapping agent in a dihydrogen hexafluorozirconate solution as a metal fluoride complex, and then leaving for 3 hours so as to deposit $ZrO_2$ on the surface of silicon, and the silicon power was cleaned with water and dried under reduced pressure to form each of the anode materials. At that time, the concentration of dihydrogen hexafluorozirconate and the immersing time were the same as those in Examples 1-6 through 1-8.

Next, 90 wt % of the formed anode material and 10 wt % of polyvinylidene fluoride as a binder were mixed to form a mixture, and the mixture was dispersed in N-methyl-2-pyrrolidone as a solvent to form anode mixture slurry. Next, the anode mixture slurry was uniformly applied to the anode current collector 52A made of copper foil with a thickness of 18 μm, and the anode mixture slurry was dried and pressurized, and then the anode mixture slurry was heated at 400° C. for 12 hours in a vacuum atmosphere to form the anode active material layer 52B. After that, the anode current collector 52A on which the anode active material layer 52B was formed was stamped into a pellet with a diameter of 16 mm to form the anode 52. The formed anode 52 was used to determine the ratio of the coating portion made of $TiO_2$ or $ZrO_2$ to the active portion made of silicon by ICP-AES. The results are shown in Table 2. Moreover, XPS was performed on the surface of the anode 52 to determine the atom ratio of titanium or zirconium to silicon. The results are shown in Table 2.

After the anode 52 was formed, as in the case of Examples 1-1 through 1-8, a secondary battery was formed through the use of the anode 52.

As Comparative Example 2-1 relative to Examples 2-1 through 2-7, an anode was formed as in the case of Examples 2-1 through 2-7 except that the coating portion was not formed, and a secondary battery using the anode was formed. Moreover, as Comparative Example 2-2, a secondary battery was formed as in the case of Examples 2-1 through 2-4 except that the time of immersing silicon powder in a solution formed through dissolving boric acid in ammonium hexafluorotitanate was changed, and $TiO_2$ was deposited on the surface of silicon to form the coating portion, thereby an anode material was formed. At that time, the immersing time was 31 hours. Moreover, the anode of Comparative Example 2-2 was used to determine the ratio of the coating portion made of $TiO_2$ to the active portion made of silicon by ICP-AES, and XPS was performed on the anode to determine the atom ratio of the titanium to silicon. The results are shown in Table 2.

The cycle characteristics of the secondary batteries of Examples 2-1 through 2-7 and Comparative Examples 2-1 and 2-2 were determined as in the case of Examples 1-1 through 1-8. The results are shown in Table 2.

TABLE 2

Battery shape; Coin type

| | MANUFACTURING CONDITIONS | | | | |
|---|---|---|---|---|---|
| | METAL FLUORIDE COMPLEX | | FLUORINE ANION TRAPPING AGENT | | IMMERSING |
| | KIND | Mol/l | KIND | Mol/l | TIME |
| EXAMPLE 2-1 | AMMONIUM | 0.02 | BORIC | 0.2 | 0.5 |
| EXAMPLE 2-2 | HEXAFLUOROTITANATE | 0.05 | ACID | 0.15 | 1 |
| EXAMPLE 2-3 | | 0.05 | | 0.15 | 3 |
| EXAMPLE 2-4 | | 0.05 | | 0.15 | 6 |
| EXAMPLE 2-5 | DIHYDROGEN | 0.06 | ALUMINUM PLATE | | 1 |
| EXAMPLE 2-6 | HEXAFLUOROZIRCONATE | 0.06 | | | 3 |
| EXAMPLE 2-7 | | 0.06 | | | 6 |
| COMPARATIVE EXAMPLE 2-1 | — | 0 | — | 0 | 0 |
| COMPARATIVE EXAMPLE 2-2 | AMMONIUM HEXAFLUOROTITANATE | 0.05 | BORIC ACID | 0.15 | 31 |

| | ANODE MATERIAL | | | | DISCHARGE CAPACITY RETENTION RATIO (%) |
|---|---|---|---|---|---|
| | | COATING PORTION | | | |
| | ACTIVE PORTION | KIND | COATING AMOUNT (WT %) | SURFACE ATOM RATIO | AT % |
| EXAMPLE 2-1 | SILICON (FIRING) | $TiO_2$ | 5.1 | Ti/Si | 0.9 | 72 |
| EXAMPLE 2-2 | | | 4.2 | | 1.4 | 72 |
| EXAMPLE 2-3 | | | 6.0 | | 2.5 | 73 |

TABLE 2-continued

Battery shape; Coin type

|  |  |  |  |  |  |
|---|---|---|---|---|---|
| EXAMPLE 2-4 |  |  | 9.2 |  | 3.5 | 71 |
| EXAMPLE 2-5 |  | ZrO$_2$ | 3.0 | Zr/Si | 0.5 | 71 |
| EXAMPLE 2-6 |  |  | 4.1 |  | 1.3 | 72 |
| EXAMPLE 2-7 |  |  | 7.3 |  | 1.8 | 71 |
| COMPARATIVE EXAMPLE 2-1 | SILICON (FIRING) | — | — | — | — | 70 |
| COMPARATIVE EXAMPLE 2-2 |  | TiO$_2$ | 30 | Ti/Si | 30 | 68 |

As shown in Table 2, as in the case of Examples 1-1 through 1-8, in Examples 2-1 through 2-4 in which the ratio of the coating portion made of TiO$_2$ to the active portion made of silicon was within a range from 0.01 wt % to 10 wt % inclusive, and the ratio of titanium to silicon in the surface of the anode was within a range from 0.1 at % to 20 at % inclusive, the discharge capacity retention ratio was improved, compared to Comparative Example 2-1 in which the coating portion was not included or Comparative Example 2-2 in which the ratio of the coating portion made of TiO$_2$ to the active portion made of silicon was larger than 10 wt %, and the ratio of titanium to silicon in the surface of the anode was larger than 20 at %. Moreover, in Examples 2-5 through 2-7 in which the coating portion made of ZrO$_2$ was included, a high discharge capacity retention ratio was obtained in a like manner.

In other words, it was found out that when the anode material including the active portion including silicon as an element and the coating portion of a metal oxide arranged on a part of the surface of the active portion was used, and the ratio of the coating portion to the active portion was within a range from 0.01 wt % to 10 wt % inclusive, and the ratio of the metal element making up the metal oxide to silicon in the surface of the anode was within a range from 0.1 at % to 20 at % inclusive, the cycle characteristics could be improved.

Examples 3-1 to 3-7

In Examples 3-1 through 3-4, anode materials including an active portion made of a SnCoC-containing material and a coating portion made of TiO$_2$ were formed through the following steps. The SnCoC-containing material was immersed in a solution formed through dissolving boric acid as a fluorine anion trapping agent in ammonium hexafluorotitanate as a metal fluoride complex so as to deposit TiO$_2$ on the surface of the SnCoC-containing material, and the SnCoC-containing material was cleaned with water, and dried under reduced pressure to form the anode materials. At that time, the concentration of ammonium hexafluorotitanate, the concentration of boric acid and the immersing time were the same as those in Examples 1-1 through 1-4.

Moreover, in Examples 3-5 through 3-7, anode materials including an active portion made of a SnCoC-containing material and a coating portion made of ZrO$_2$ were formed through the following steps. The SnCoC-containing material was stirred and immersed in a solution formed through immersing an aluminum plate with a surface area of 48 cm$^2$ as a fluorine anion trapping agent in a dihydrogen hexafluorozirconate solution as a metal fluoride complex, and then leaving for 3 hours so as to deposit ZrO$_2$ on the surface of the SnCoC-containing material, and the SnCoC-containing material was cleaned with water and dried under reduced pressure to form the anode materials. At that time, the concentration of dihydrogen hexafluorozirconate and the immersing time were the same as those in Examples 1-6 through 1-8.

Figure 6:
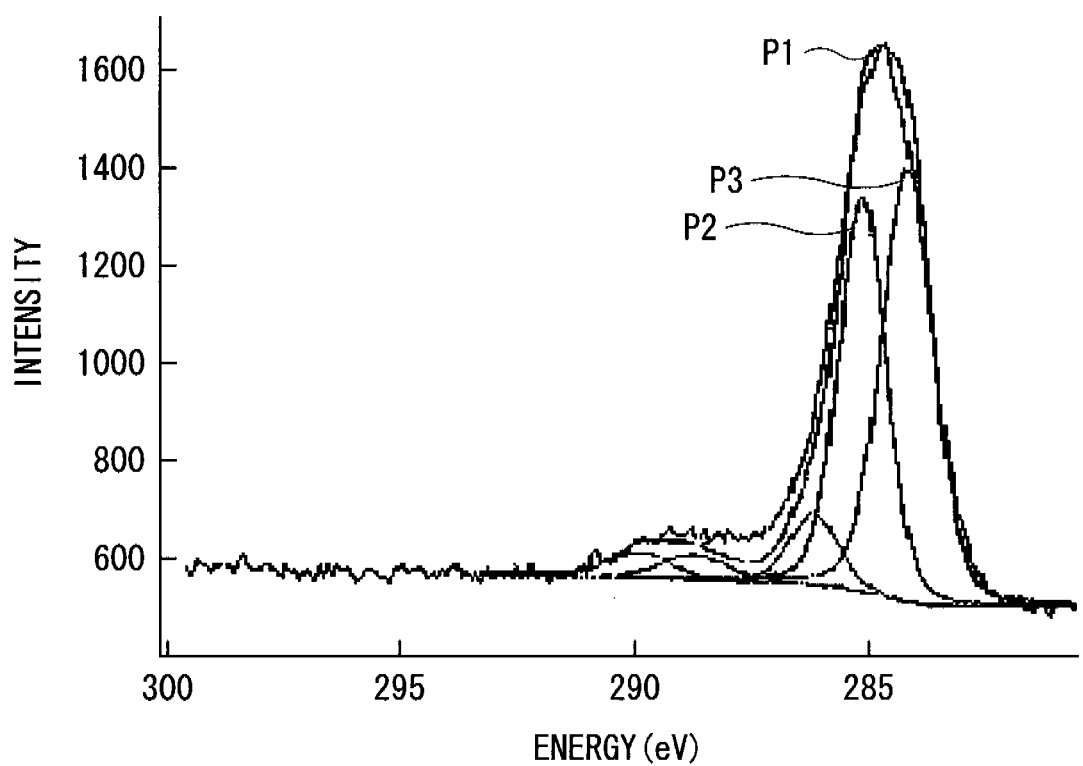
FIG. 6 is a plot showing an example of peaks obtained by X-ray photoelectron spectroscopy of a SnCoC-containing material formed in an example.

The SnCoC-containing material was synthesized through mixing tin-cobalt-indium alloy powder and carbon powder, and using a mechanochemical reaction. When the composition of the obtained SnCoC-containing material was analyzed, the tin content was 48 wt %, the cobalt content was 23 wt % and the carbon content was 20 wt %, and the ratio Co/(Sn+Co) of cobalt to the total of tin and cobalt was 32.4 wt %. The carbon content was measured by a carbon/sulfur analyzer, and the contents of cobalt and tin were measured by ICP (Inductively Coupled Plasma) emission spectrometry. Moreover, when X-ray diffraction was performed on the obtained SnCoC-containing material, a diffraction peak having a broad half-width in which the diffraction angle 2θ was 1.0° or over was observed within a range of the diffraction angle 2θ=20° to 50°. Further, when XPS was performed on the obtained SnCoC-containing material, a peak P1 shown in FIG. 6 was obtained. When the peak P1 was analyzed, a peak P2 of surface contamination carbon and a peak P3 of C1s in the SnCoC-containing material on a lower energy side than the peak P2 were obtained. The peak P3 was obtained in a region lower than 284.5 eV. In other words, it was confirmed that carbon included in the SnCoC-containing material was bonded to another element.

Next, 80 parts by weight of each of the formed anode materials, 11 parts by weight of graphite and 1 part by weight of acetylene black as electrical conductors and 8 parts by weight of polyvinylidene fluoride as a binder were mixed to form a mixture, and the mixture was dispersed in N-methyl-2-pyrrolidone as a solvent to form anode mixture slurry. Next, the anode mixture slurry was uniformly applied to the anode current collector 52A made of copper foil with a thickness of 10 μm, and the anode mixture slurry was dried and compression molded to form the anode active material layer 52B. After that, the anode current collector 52A on which the anode active material layer 52B was formed was stamped into a pellet with a diameter of 16 mm to form the anode 52. The formed anode 52 was used to determine the ratio of the coating portion made of TiO$_2$ or ZrO$_2$ to the active portion made of the SnCoC-containing material by ICP-AES. The results are shown in Table 3. Moreover, XPS was performed on the surface of the anode 52 to determine the atom ratio of titanium or zirconium to tin. The results are shown in Table 3.

After the anode 52 was formed, a secondary battery was formed through the use of the anode 52 as in the case of Examples 1-1 through 1-8.

As Comparative Example 3-1 relative to Examples 3-1 through 3-7, an anode was formed as in the case of Examples 3-1 through 3-7, except that the coating portion was not formed, and a secondary battery was formed through the use of the anode. Moreover, as Comparative Example 3-2, a secondary battery was formed as in the case of Examples 3-1 through 3-4, except that the time of immersing the SnCoC-containing material in a solution formed through dissolving boric acid in ammonium hexafluorotitanate was changed, and TiO$_2$ was deposited on the surface of the SnCoC-containing material to form the coating portion, thereby the anode material was formed. At that time, the immersing time was 31 hours. Moreover, the anode of Comparative Example 3-2 was used to determine the ratio of the coating portion made of $TiO_2$ to the active portion made of the SnCoC-containing material by ICP-AES, and XPS was performed to determine the atom ratio of titanium to tin. The results are shown in Table 3.

The cycle characteristics of the secondary batteries of Examples 3-1 through 3-7 and Comparative Examples 3-1 and 3-2 were determined as in the case of examples 1-1 through 1-8. The results are shown in Table 3.

element and the coating portion of a metal oxide arranged in a part of the surface of the active portion was used, and the ratio of the coating portion to the active portion was within a range from 0.01 wt % to 10 wt % inclusive, and the ratio of the metal element making up the metal oxide to tin on the surface of the anode was within a range from 0.1 at % to 20 at % inclusive, the cycle characteristics could be improved.

Examples 4-1 to 4-3

Cylindrical-type secondary batteries shown in FIGS. 1 and 2 were formed. The cathode 21 and the anode 22 were

TABLE 3

Battery shape; Coin type

| | MANUFACTURING CONDITIONS | | | | |
|---|---|---|---|---|---|
| | METAL FLUORIDE COMPLEX | | FLUORINE ANION TRAPPING AGENT | | IMMERSING |
| | KIND | Mol/l | KIND | Mol/l | TIME |
| EXAMPLE 3-1 | AMMONIUM | 0.02 | BORIC | 0.2 | 0.5 |
| EXAMPLE 3-2 | HEXAFLUOROTITANATE | 0.05 | ACID | 0.15 | 1 |
| EXAMPLE 3-3 | | 0.05 | | 0.15 | 3 |
| EXAMPLE 3-4 | | 0.05 | | 0.15 | 6 |
| EXAMPLE 3-5 | DIHYDROGEN | 0.06 | ALUMINUM PLATE | | 1 |
| EXAMPLE 3-6 | HEXAFLUOROZIRCONATE | 0.06 | | | 3 |
| EXAMPLE 3-7 | | 0.06 | | | 6 |
| COMPARATIVE EXAMPLE 3-1 | — | 0 | — | 0 | 0 |
| COMPARATIVE EXAMPLE 3-2 | AMMONIUM HEXAFLUOROTITANATE | 0.05 | BORIC ACID | 0.15 | 31 |

| | ANODE MATERIAL | | | | DISCHARGE CAPACITY RETENTION RATIO (%) |
|---|---|---|---|---|---|
| | | COATING PORTION | | | |
| | ACTIVE PORTION | KIND | COATING AMOUNT (WT %) | SURFACE ATOM RATIO AT % | |
| EXAMPLE 3-1 | SnCoC— CONTAINING MATERIAL | $TiO_2$ | 3.4 | Ti/Sn 0.5 | 93 |
| EXAMPLE 3-2 | | | 2.0 | 0.6 | 95 |
| EXAMPLE 3-3 | | | 4.0 | 1.2 | 95 |
| EXAMPLE 3-4 | | | 6.2 | 1.8 | 94 |
| EXAMPLE 3-5 | | $ZrO_2$ | 6.0 | Zr/Sn 0.2 | 94 |
| EXAMPLE 3-6 | | | 7.9 | 0.3 | 95 |
| EXAMPLE 3-7 | | | 10.0 | 0.6 | 93 |
| COMPARATIVE EXAMPLE 3-1 | SnCoC— CONTAINING MATERIAL | — | — | — | 92 |
| COMPARATIVE EXAMPLE 3-2 | | $TiO_2$ | 32 | Ti/Sn 50 | 80 |

As shown in Table 3, as in the case of Examples 1-1 through 1-8, in Examples 3-1 through 3-4 in which the ratio of the coating portion made of $TiO_2$ to the active portion made of the SnCoC-containing material was within a range from 0.01 wt % to 10 wt % inclusive, and the ratio of titanium to tin in the surface of the anode was within a range from 0.1 at % to 20 at % inclusive, the discharge capacity retention ratio was improved, compared to Comparative Example 3-1 in which the coating portion was not included or Comparative Example 3-2 in which the ratio of the coating portion made of $TiO_2$ to the active portion made of the SnCoC-containing material was larger than 10 wt %, and the ratio of titanium to tin in the surface of the anode was larger than 20 at %. Moreover, in Examples 3-5 through 3-7 in which the coating portion made of $ZrO_2$ was included, a high discharge capacity retention ratio was obtained in a like manner.

In other words, it was found out that when the anode material including the active portion including tin as an formed as in the case of Examples 1-1 through 1-3. In other words, after the active portion made of silicon was formed by an electron beam evaporation method, the coating portion made of $TiO_2$ was formed to form the anode 22.

As the separator 23, a microporous polypropylene film with a thickness of 25 μm was used, and the same electrolyte solution as that used in Examples 1-1 through 1-8 was used.

Moreover, as Comparative Example 4-1 relative to Examples 4-1 through 4-3, a secondary battery was formed as in the case of Examples 4-1 through 4-3, except that the coating portion was not formed, that is, an anode formed as in the case of Comparative Example 1-1 was used. Moreover, as Comparative Example 4-2, a secondary battery was formed as in the case of Examples 4-1 through 4-3, except that the time of immersing the anode current collector on which silicon was deposited in a solution formed through dissolving boric acid in ammonium hexafluorotitanate was changed, and $TiO_2$ was deposited on the surface of silicon to form the coating portion, thereby the anode material was formed, that is, more specifically the same anode material as that in Comparative Example 1-2 was used.

The cycle characteristics of the secondary batteries of Examples 4-1 through 4-3 and Comparative Examples 4-1 and 4-2 were determined as in the case of Examples 1-1 through 1-8. The results are shown in Table 4.

TABLE 4

Battery shape: Cylindrical type

| | ANODE MATERIAL | | | | MANUFACTURING CONDITIONS | | | DISCHARGE CAPACITY |
| | | COATING PORTION | | | | | | |
| | ANODE ACTIVE MATERIAL | KIND | COATING AMOUNT (WT %) | TI/Si (AT %) | AMMONIUM HEXAFLUOROTITANATE (mol/l) | BORIC ACID (mol/l) | IMMERSING TIME | RETENTION RATIO (%) |
|---|---|---|---|---|---|---|---|---|
| EXAMPLE 4-1 | SILICON (ELECTRON BEAM EVAPORATION) | TiO$_2$ | 0.3 | 1.0 | 0.02 | 0.2 | 0.5 | 79 |
| EXAMPLE 4-2 | | | 0.2 | 1.5 | 0.05 | 0.15 | 1 | 80 |
| EXAMPLE 4-3 | | | 0.2 | 2.3 | 0.05 | 0.15 | 3 | 79 |
| COMPARATIVE EXAMPLE 4-1 | SILICON (ELECTRON BEAM EVAPORATION) | — | — | — | — | — | — | 78 |
| COMPARATIVE EXAMPLE 4-2 | | TiO$_2$ | 14 | 40 | 0.05 | 0.15 | 31 | 70 |

As shown in Table 4, the same results as those in Examples 1-1 through 1-5 were obtained. In other words, it was found out that in a secondary battery with another shape, when the anode material including the active portion including silicon as an element and the coating portion of a metal oxide arranged in a part of the surface of the active portion was used, and the ratio of the coating portion to the active portion was within a range from 0.01 wt % to 10 wt % inclusive, and the ratio of a metal element making up the metal oxide to silicon in the surface of the anode was within a range from 0.1 at % to 20 at % inclusive, the cycle characteristics could be improved.

Examples 5-1 to 5-3

Laminate film type secondary batteries shown in FIGS. 3 and 4 were formed. At first, the cathode 33 and the anode 34 were formed as in the case of Examples 1-1 through 1-3. In other words, after the active portion made of silicon was formed by an electron beam evaporation method, the coating portion made of TiO$_2$ was formed to form the anode 34.

Next, an electrolyte solution was formed through mixing 4-fluoro-1,3-dioxolane-2-one and propylene carbonate as solvents at a weight ratio of 1:1 to form a mixture, and dissolving 1 mol/l of lithium hexafluorophosphate as an electrolyte salt in the mixture. Then, as a polymer compound, a copolymer formed through block copolymerizing vinylidene fluoride and hexafluoropropylene at a weight ratio of vinylidene fluoride:hexafluoropropylene=93:7 was prepared, and the polymer compound and the formed electrolyte solution were mixed through the use of a mixed solvent to form a precursor solution. After that, the formed precursor solution was applied to the cathode 33 and the anode 34, and the mixed solvent was volatilized, thereby the gel-like electrolyte layer 36 was formed.

Next, the cathode lead 31 made of aluminum was attached to the cathode 33, and the anode lead 32 made of nickel was attached to the anode 34. Then, after the cathode 33 and the anode 34 were laminated with the separator 35 made of polyethylene with a thickness of 25 μm in between, and were spirally wound, they were sealed in the package members 40 made of a laminate film under reduced pressure so as to form each of the secondary batteries.

As Comparative Example 5-1 relative to Examples 5-1 through 5-3, a secondary battery was formed as in the case of Examples 5-1 through 5-3, except that the coating portion was not formed, that is, an anode formed as in the case of Comparative Example 1-1 was used. Moreover, as Comparative Example 5-2, and secondary battery was formed as in the case of Examples 5-1 through 5-3, except that the time of immersing the anode current collector on which silicon was deposited in a solution formed through dissolving boric acid in ammonium hexafluorotitanate was changed, and TiO$_2$ was deposited on the surface of silicon to form the coating portion, thereby the anode material was formed, that is, more specifically, the same anode material as that in Comparative Example 1-2 was used.

The cycle characteristics of the secondary batteries of Examples 5-1 through 5-3 and Comparative Examples 5-1 and 5-2 were determined. The results are shown in Table 5.

TABLE 5

Battery shape: Laminate film type

| | ANODE MATERIAL | | | | MANUFACTURING CONDITIONS | | | DISCHARGE CAPACITY |
| | | COATING PORTION | | | | | | |
| | ANODE ACTIVE MATERIAL | KIND | COATING AMOUNT (WT %) | TI/Si (AT %) | AMMONIUM HEXAFLUOROTITANATE (mol/l) | BORIC ACID (mol/l) | IMMERSING TIME | RETENTION RATIO (%) |
|---|---|---|---|---|---|---|---|---|
| EXAMPLE 5-1 | SILICON (ELECTRON | TiO$_2$ | 0.3 | 1.0 | 0.02 | 0.2 | 0.5 | 78 |
| EXAMPLE 5-2 | | | 0.2 | 1.5 | 0.05 | 0.15 | 1 | 80 |

TABLE 5-continued

Battery shape: Laminate film type

| | ANODE MATERIAL | | | | MANUFACTURING CONDITIONS | | | DISCHARGE CAPACITY |
|---|---|---|---|---|---|---|---|---|
| | | COATING PORTION | | | | | | |
| | ANODE ACTIVE MATERIAL | KIND | COATING AMOUNT (WT %) | TI/Si (AT %) | AMMONIUM HEXAFLUOROTITANATE (mol/l) | BORIC ACID (mol/l) | IMMERSING TIME | RETENTION RATIO (%) |
| EXAMPLE 5-3 | BEAM EVAPORATION) | | 0.2 | 2.3 | 0.05 | 0.15 | 3 | 80 |
| COMPARATIVE EXAMPLE 5-1 | SILICON (ELECTRON | — | — | — | — | — | — | 75 |
| COMPARATIVE EXAMPLE 5-2 | BEAM EVAPORATION) | $TiO_2$ | 14 | 40 | 0.05 | 0.15 | 31 | 68 |

As shown in Table 5, the same results as those in Examples 1-1 through 1-5 were obtained. In other words, in the case of a secondary battery having another shape, when the anode material including the active portion including silicon as an element and the coating portion of a metal oxide arranged in a part of the surface of the active portion was used, and the ratio of the coating portion to the active portion was within a range from 0.01 wt % to 10 wt % inclusive, and the ratio of the metal element making up the metal oxide to silicon on the surface of the anode was within a range from 0.1 at % to 20 at %, the cycle characteristics could be improved.

Although the invention is described referring to the embodiments and the examples, the invention is not limited to the embodiments and the examples, and can be variously modified. For example, in the embodiments and the examples, the case where the electrolyte solution or the gel electrolyte in which the polymer compound holds the electrolyte solution is used as the electrolyte is described; however, any other electrolyte may be used. Examples of the other electrolyte include an ionic conductive inorganic compound such as ion conductive ceramic, ion conductive glass or ionic crystal, any other inorganic compound, or a mixture of any of these inorganic compounds and an electrolyte solution or a gel electrolyte.

Moreover, in the embodiments and the examples, the battery using lithium as an electrode reactant is described; however, any other alkali metal such as sodium (Na) or potassium (K), alkali earth metal such as magnesium or calcium (Ca), any other light metal such as aluminum may be used in the invention.

Further, in the embodiments and the examples, the cylindrical type, the laminate film type or the coin type secondary battery is described in detail; however, the invention is applicable to a secondary battery with any other shape such as a button type or prismatic type, or a secondary battery with any other structure such as a laminate structure. In addition, the invention is applicable to not only secondary batteries but also any other batteries such as primary batteries in a like manner.

It should be understood by those skilled in the art that various modifications, combinations, sub-combinations and alterations may occur depending on design requirements and other factors insofar as they are within the scope of the appended claims or the equivalents thereof.

What is claimed is:

1. An anode comprising:
   a current collector; and
   an anode active material layer on the collector, the anode active material layer comprising an anode active material portion and a surface coating deposited on a part but not all of the anode active material portion,
   wherein,
   the anode active material portion includes silicon or a silicon-based material,
   the anode active material portion is a first deposited layer and the surface coating is a second deposited layer,
   the surface coating includes $TiO_2$,
   a ratio of the Ti in $TiO_2$ in the surface coating to the silicon in the anode active material portion as determined by X-ray photoelectron spectroscopy is from 0.1 at % to 20 at %, and a ratio of the surface coating to the anode active material portion is from 0.01 wt % to 10 wt %.

2. An anode comprising:
   a current collector; and
   an anode active material layer on the collector, the anode active material layer comprising an anode active material portion and a surface coating deposited on a part but not all of the anode active material portion,
   wherein,
   the anode active material portion includes tin or a tin-based material,
   the anode active material portion is a first deposited layer and the surface coating is a second deposited layer,
   the surface coating includes $TiO_2$,
   a ratio of the Ti in $TiO_2$ in the surface coating to the tin in the anode active material portion as determined by X-ray photoelectron spectroscopy is from 0.1 at % to 20 at %, and
   a ratio of the surface coating to the anode active material portion is from 0.01 wt % to 10 wt %.

3. The anode according to claim 1 or 2, wherein the surface coating is deposited on the anode active material portion via a liquid phase deposition.

4. The anode according to claim 1 or 2 wherein, the anode active material portion is formed via at least one of a melting and solidifying a mixture method, a mechanochemical method, a mechanical alloying method, or a mechanical milling method.

5. The anode according to claim 2, wherein:
   the anode active material portion includes an SnCoC-containing material,
   a carbon content of the SnCoC-containing material is from 9.9 wt % to 29.7 wt %, and
   a ratio Co/(Sn+Co) is from 30 wt % to 70 wt %.

6. The anode according to claim 5, wherein a diffractive peak having a broad half-width in which a diffractive angle 2θ is 1.0° or over within a range of 2θ=20° to 50° when an X-ray diffraction is performed on the SnCoC-containing material.

7. A lithium-ion secondary battery comprising:
a cathode;
an anode including an anode active material layer; and
an electrolyte,
wherein,
the anode active material layer includes an anode active material portion and a surface coating deposited on part but not all of the anode active material portion,
the anode active material mer portion includes a silicon-based material,
the anode active material portion is a solid mixture,
the surface coating includes $TiO_2$,
a ratio of the Ti in $TiO_2$ in the surface coating to the silicon in the anode active material portion as determined by X-ray photoelectron spectroscopy is from 0.1 at % to 20 at %,
a ratio of the surface coating to the anode active material portion is from 0.01 wt % to 10 wt %.

8. The lithium-ion secondary battery according to claim 7 wherein the surface coating is deposited on the anode active material portion via a liquid phase deposition.

9. The lithium-ion secondary battery according to claim 7 wherein, the anode active material portion is formed by at least one of a melting and solidifying a mixture method, a mechanochemical method, a mechanical alloying method, or a mechanical milling method.

10. The lithium-ion secondary battery according to claim 7, wherein:
the anode active material portion includes an SnCoC-containing material,
a carbon content is from 9.9 wt % to 29.7 wt %, and
a ratio Co/(Sn+Co) is from 30 wt % to 70 wt %.

11. The lithium-ion secondary battery according to claim 10, wherein a diffraction peak having a broad half-width in which a diffraction angle 2θ is 1.0° or over within a range of 2θ=20° to 50° when an X-ray diffraction is performed on the SnCoC-containing anode active material portion.

12. The lithium-ion secondary battery according to claim 7, wherein the electrolyte includes a fluorinated carbonate.

13. The lithium-ion secondary battery according to claim 12, wherein the fluorinated carbonate includes at least one compound selected from the group consisting of 4-fluoro-1,3-dioxolane-2one, 4.5-difluoro-1.3-dioxolane-2-one, fluoromethyl methyl carbonate, bis(fluoromethyl) carbonate and difluoromethyl methyl carbonate.

14. A battery comprising:
a cathode;
an anode including an anode active material layer; and
an electrolyte,
wherein,
the anode active material layer includes an anode active material portion and a surface coating deposited on part but not all of the anode active material portion,
the anode active material portion includes a silicon-based material,
the anode active material portion is a solid mixture,
the surface coating includes $TiO_2$,
a ratio of the Ti in the $TiO_2$ in the surface coating to the silicon in anode active material portion as determined by X-ray photoelectron spectroscopy is from 0.1 at % to 20 at %, and
the ratio of the surface coating to the anode active material portion is from 0.01 wt % to 10 wt %.

15. The battery according to claim 14, wherein the surface coating is deposited on the anode active material portion via a liquid phase deposition.

16. The battery according to claim 14 wherein, the anode active material portion is formed by at least one of a melting and solidifying a mixture method, a mechanochemical method, a mechanical alloying method, or a mechanical milling method.

17. The battery according to claim 14, wherein:
the anode active material portion includes an SnCoC-containing material,
a carbon content is from 9.9 wt % to 29.7 wt %, and
a ratio Co/(Sn+Co) is from 30 wt % to 70 wt %.

18. The battery according to claim 17, wherein a diffraction peak having a broad half-width in which a diffraction angle 2θ is 1.0° or over is observed within a range of the diffraction angle 2θ=20° to 50° when an X-ray diffraction is performed on the SnCoC-containing anode active material portion.

19. The battery according to claim 14, wherein the electrolyte includes a fluorinated carbonate.

20. The battery according to claim 19, wherein the fluorinated carbonate includes at least one compound selected from the group consisting of 4-fluoro-1,3-dioxolane-2one, 4.5-difluoro-1.3-dioxolane-2-one, fluoromethyl methyl carbonate, bis(fluoromethyl) carbonate and difluoromethyl methyl carbonate.

* * * * *